United States Patent [19]

Heinen

[11] Patent Number: 4,559,368

[45] Date of Patent: Dec. 17, 1985

[54] FIRE-GUARD COMPOSITION AND METHOD FOR PREPARING SAME

[75] Inventor: Hans-Dieter J. Heinen, Malmedy, Belgium

[73] Assignee: Intellectual Trade Cy S.A., Charlotte, Luxembourg

[21] Appl. No.: 107,974

[22] Filed: Dec. 28, 1979

Related U.S. Application Data

[63] Continuation of Ser. No. 873,809, Jan. 31, 1978, abandoned.

[30] Foreign Application Priority Data

Jan. 31, 1977 [LU] Luxembourg ............................ 76670

[51] Int. Cl.$^4$ ............................................... C08J 9/00
[52] U.S. Cl. ........................................ 521/91; 521/92; 521/145; 521/149; 524/447; 524/556; 524/557; 524/567
[58] Field of Search ................... 521/91, 92, 145, 149; 260/29.6 MM, 29.6 M; 524/447, 556, 557, 567

[56] References Cited

U.S. PATENT DOCUMENTS

| | | | |
|---|---|---|---|
| 2,465,295 | 3/1949 | Strauss | 260/29.6 MM |
| 3,239,475 | 3/1966 | Clark | 260/29.6 MM |
| 3,483,156 | 12/1969 | Mills et al. | 260/29.6 R |
| 4,013,599 | 3/1977 | Strauss et al. | 260/2.5 FP |
| 4,043,950 | 8/1977 | Wilmsen | 260/2.5 FP |

FOREIGN PATENT DOCUMENTS 1524091 6/1978 United Kingdom .

OTHER PUBLICATIONS

Dibrov et al., Chem. Abstracts (Ceramics), vol. 83, p. 301, col. 1, 136152x, 1975.

Primary Examiner—Morton Foelak
Attorney, Agent, or Firm—Blum Kaplan Friedman Silberman & Beran

[57] ABSTRACT

There is described a fire-guard composition, particularly a composition provided as a compound, a coating or a lining, which comprises kaolin and an organic binder, said binder being air hardenable and insoluble in water after polymerizing.

18 Claims, No Drawings

FIRE-GUARD COMPOSITION AND METHOD FOR PREPARING SAME

This is a continuation of application Ser. No. 873,809, filed Jan. 31, 1978 and now abandoned.

This invention relates to a fire-guard composition, particularly a composition provided as a compound, a coating or a lining.

Among the known flame-guard compositions, the most-used ones generally comprise as essential component antimonium trioxide, arsenic salts, chlorine salts and/or bromine salts.

The invention lies in providing a fire-guard composition in which said components are not absolutely required and can even be dispensed with without influencing the fire-proofing or other properties of the composition concerned.

Moreover the invention has for object to provide a composition which has a very good adherence to the surfaces to be protected, even at very high temperatures, for example in the case of fire.

Finally the invention has also for object to provide a composition of very low cost and very easy to manufacture.

For this purpose according to the invention, the fire-guard composition comprises kaolin and an organic binder, said binder being air-hardenable and insoluble in water after polymerizing.

Advantageously, said kaolin, is present as ceramic fibres with a length from 0.5 to 10 mm.

In a preferred embodiment of the invention, the fire-guard composition contains an additive for increasing the flexibility thereof, said additive being essentially comprised of a water-emulsifiable oil.

The invention also relates to a particular method for preparing said composition.

This method is characterized by the fact that there is first formed a substantially homogeneous emulsion of oil in the binder and said kaolin is mixed with said emulsion.

Other details and features of the invention will stand out from the following description given by way of non limitative example, of some embodiments of the fire-guard composition according to the invention and of a particular embodiment of a method for preparing said composition.

The invention mostly relates to a fire-guard composition in the form of a compound, a coating or a lining.

The viscosity of said composition can vary within very large limits according to the intended application. For instance the composition can possibly be in a relatively fluid form to allow spreading same easily on the walls to be protected and pouring same between the members to be guarded, such as electric cable arrays or any pipings, between which a fire-guard protection should be provided.

Said composition essentially comprises thouroughly mixed kaolin and an organic binder, said binder being hardened by air and being water-insoluble after polymerizing.

Said kaolin is advantageously present as ceramic fibers and the mean length of said fibers is preferably in the range from 0.5 to 10 mm.

To obtain a composition with a very good resistance to fire, it is useful for the kaolin content to be as high as possible. However for other considerations such as consistency, adherence, resiliency, etc, this content lies generally between 20 and 45% by weight and preferably in the range from 25 to 30% by weight, and preferably said kaolin content further contains an additive to increase the flexibility thereof.

Said binder should not necessarily have a very good resistance to fire which is the opposite of what might be expected. The essential purpose of this binder is actually to retain the ceramic fibers with a spacing which is statiscally distributed to allow simultaneously to form by means of such a composition, a heat-insulating layer. Said binder may for example be affected by heat and even burn. It is however required that said binder goes on forming as far as possible a layer which has some heat insulation while generating a minimum amount of smoke. Said binder has generally a polyvinyl base and preferably a polyvinyl acetate base which is in colloidal suspension in water. The binder content in the composition may for example vary between 45 and 75% according to the kaolin content. A preferred binder content lies in the range from 65 to 72% by weight.

In should also be noted that according to the invention, the fireguard composition is free from flammable solvents.

One of the essential objects of said additive which is preferably formed by emulsifiable oil and notably by so-called "soluble" oil, lies in insuring mostly when applying the composition over surfaces or surface portions to be protected, the formation of a kneadable and relatively flexible and resilient product after drying. The proportion of said additive may lie in the range from 2 to 10% by weight and preferably in the range from 2 to 6% by weight.

The quality of the fire-quard composition according to the invention can be improved mostly in that case where use is made of relatively higher proportion of ceramic fibers, by adding a substantially unflammable thickening agent, such as kaolin or asbestos powder, perlite, expanded mica, diatomite or plaster.

A typical fire-guard composition according to the invention, is as follows:

27% by weight of kaolin (Kaowool)
69.5% of binder on the basis of polyvinyl acetate in colloidal suspension in water.
3.5% of soluble oil.

The method for preparing the composition according to the invention lies essentially in first forming a substantially homogeneous emulsion of the oil in the binder and then in mixing said emulsion with said kaolin which is preferably present as ceramic fibers. To this mixture may then possibly be added said thickening agent as a powder in such a way that said agent will fill at least partly the pores and interstices which are possibly present about the kaolin fibers.

Said fire-guard composition according to the invention may advantageously be applied as protecting compound on electric sheated cables or pipings passing through walls.

By suitably selecting the ratio between the various components and by possibly adding plastifying or surface-active agents, it is possible to adapt the properties of the composition according to the intended use.

It is possible for example to use relatively large proportions of plaster to form a lining for ceilings, for instance as tiles arranged side by side to obtain sufficient fire-proofing of such ceilings.

It must be understood that the invention is in no way limited to the above embodiments and that many changes can be brought therein without departing from the scope of the invention as defined by the appended claims.

For instance the organic binder may be on the basis of polyvinyl chloride latex, of vinyl chloride-vinyl acetate copolymer, of polyvinylacetal, of polyvinyl acetate, of polyvinyl butyral, possibly with the addition of plastifying agents. These are essentially vinyl compounds which may be used to prepare paints, binders or similar suspensions which may dry under the action of air when spread over surfaces.

The composition according to the invention may further contain mostly for protecting steel beams, products which impart to the composition under the action of heat or when burning, a foam structure which has some resistance to fire, which then further protects the material which is covered by said composition. Such products are for example carbon hydrates, inorganic salts releasing by dissociating at high temperature, gases which impart a cell structure to the composition, etc.

I claim:

1. A flame resistant composition which may be applied to form a coating or a lining comprising kaolin a ceramic fiber dispersed in an air-hardenable organic binder, said binder being insoluble in water after hardening and said fiber being randomly distributed throughout the binder in an amount between about 20 and 45 weight percent based on the total weight of the composition after hardening.

2. The flame resistant composition of claim 1, wherein said kaolin fiber is present between about 25 and 30 weight percent.

3. The flame resistant composition of claim 1, wherein said kaolin fiber has a mean fiber length in the range from about 0.5 to 10 mm.

4. The flame resistant composition of claim 1, wherein said organic binder is an aqueous based organic binder.

5. The flame resistant composition of claim 5, wherein said aqueous based organic binder is a colloidial suspension of a polyvinyl material.

6. The flame resistant composition of claim 6, wherein said polyvinyl material is selected from the group consisting of polyvinyl chloride, vinyl chloride-vinyl acetate copolymer, polyvinyl acetal, polyvinyl acetate, polyvinyl butyral and mixtures thereof.

7. The flame resistant composition of claim 7, wherein said organic binder is a colloidial suspension of polyvinyl acetate in water.

8. The flame resistant composition of claim 1, wherein said binder is included in the composition between about 45 and 75 weight percent.

9. The flame resistant composition of claim 9, wherein the binder is present between about 65 and 72 weight percent.

10. The flame resistant composition of claim 1, free from flamable solvents.

11. The flame resistant composition of claim 1, further including an effective amount of an additive for increasing the flexibility of said composition.

12. The flame resistant composition of claim 11, wherein said additive is present between about 2 to 10 weight percent.

13. The flame resistant composition of claim 11, wherein said additive is present between about 2 to 6 weight percent.

14. The flame resistant composition of claim 1, further including a substantially inflammable thickening agent.

15. The flame resistant composition of claim 14, wherein said thickening agent is selected from the group consisting of powders of kaolin, asbestos, perlite, expanded mica, diatomite, plaster and mixtures thereof.

16. The flame resistant composition of claim 1, further including a component which will cause said composition to foam upon subjecting the hardened composition to elevated temperatures.

17. A method for preparing a flame resistant composition which may be applied as a coating or a lining comprising forming a substantially homogeneous emulsion of an emulsifible oil in an aqueous solution of an organic binder which is air-hardenable and insoluble in water after hardening and adding and dispersing kaolin fibers into said emulsion.

18. The method of claim 17, including the step of mixing powdered thickening agent for partially filling in pores and interstices present about the kaolin fibers after the composition has been applied and hardened.

* * * * *